US006958897B2

(12) United States Patent
Kubota et al.

(10) Patent No.: US 6,958,897 B2
(45) Date of Patent: Oct. 25, 2005

(54) ELECTRICAL LOAD DRIVE CONTROL APPARATUS AND ELECTRICAL LOAD DRIVE CONTROL METHOD

(75) Inventors: Ayumu Kubota, Machida (JP); Hironori Saito, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 377 days.

(21) Appl. No.: 10/379,663

(22) Filed: Mar. 6, 2003

(65) Prior Publication Data

US 2003/0174448 A1 Sep. 18, 2003

(30) Foreign Application Priority Data

Mar. 12, 2002 (JP) ....................................... 2002-066582

(51) Int. Cl.[7] .................................................. H02H 3/00

(52) U.S. Cl. ......................... 361/62; 361/100; 361/160; 361/92

(58) Field of Search ........................... 361/62, 100, 92, 361/160; 307/10.1, 36, 39

(56) References Cited

U.S. PATENT DOCUMENTS 3,876,904 A 4/1975 Weber, Jr. .................... 315/93
4,236,084 A * 11/1980 Gingras ....................... 307/39
6,127,741 A * 10/2000 Matsuda et al. .............. 307/36

FOREIGN PATENT DOCUMENTS

| | | | |
|---|---|---|---|
| JP | 4-129849 A | 4/1992 | ............ B60Q/1/04 |
| JP | 7-228186 A | 8/1995 | ............ B60Q/1/02 |
| JP | 8-282367 A | 10/1996 | ............ B60Q/1/04 |
| JP | 2001-187545 A | 7/2001 | ............ B60Q/1/04 |

* cited by examiner

*Primary Examiner*—Stephen W. Jackson
(74) *Attorney, Agent, or Firm*—Foley & Lardner LLP

(57) ABSTRACT

An electrical load drive control apparatus includes: a plurality of drive units, each of which drives one of a plurality of electrical loads; an instruction unit that issues a drive switch instruction to switch drive among the plurality of electrical loads; a detection unit that detects a non-operating state of the plurality of electrical loads; and a control unit that controls the plurality of drive units based upon the drive switch instruction issued by the instruction unit and results of a detection by the detection unit. And the control unit controls the plurality of drive units so as to set all of the plurality of electrical loads in a non-operating state if an instruction to switch drive among the plurality of electrical loads is issued by the instruction unit, and controls the plurality of drive units so as to switch drive to an electrical load selected through the drive switch instruction after verifying that the plurality of electrical loads are all set in a non-operating state based upon the results of the detection by the detection unit.

15 Claims, 4 Drawing Sheets

| | |
|---|---|
| CONDITION 1 | LOW BEAM ON REQUESTED AND HIGH BEAM OFF VERIFIED |
| CONDITION 2 | LOW BEAM OFF REQUESTED OR HIGH BEAM ON REQUESTED |
| CONDITION 3 | HIGH BEAM ON REQUESTED AND LOW BEAM OFF VERIFIED |
| CONDITION 4 | HIGH BEAM OFF REQUESTED OR LOW BEAM ON REQUESTED |

FIG.5

ELECTRICAL LOAD DRIVE CONTROL APPARATUS AND ELECTRICAL LOAD DRIVE CONTROL METHOD

BACKGROUND OF THE INVENTION

1. Field of the Invention

The present invention relates to an apparatus and a method adopted to implement drive control of electrical loads. More specifically, it relates to an apparatus and a method adopted to implement drive control of electrical loads in a vehicle.

2. Description of the Related Art

There is an electrical load control apparatus employed to control electrical loads in a vehicle in the related art that drives a headlamp comprising a main (hereafter referred to as a "high beam") lamp and a dimmer (hereafter referred to as a "low beam") lamp by lighting high beam lamp with a high beam FET and lighting the low beam lamp with a low beam FET (see Japanese Laid Open Patent Publication No. 2001-187545). It is to be noted that some control apparatuses utilize relays instead of FETs in the lamp drive circuits.

SUMMARY OF THE INVENTION

However, if an ON failure (a failure in which the electrical continuity but cannot be broken) or a fusion failure (a failure whereby the contact point comes fused and is left in a state of permanent contact) occurs in the FET or the relay in either of the lamp drive circuits for the low beam lamp or the high beam lamp in the vehicle electrical load control apparatus in the related art described above, the corresponding lamp is left in a lit state. Since the other lamp can also be lit in this situation, both the low beam lamp and the high beam lamp are turned on at the same time which induces overheating of the lamps to reduce the service life of the lamps.

The present invention provides an electrical load drive control apparatus and an electrical load drive control method that desirably prevent simultaneous operations of a plurality of electrical loads which should be engaged in operation alternately.

An electrical load drive control apparatus according to the present invention comprises: a plurality of drive units, each of which drives one of a plurality of electrical loads; an instruction unit that issues a drive switch instruction to switch drive among the plurality of electrical loads; a detection unit that detects a non-operating state of the plurality of electrical loads; and a control unit that controls the plurality of drive units based upon the drive switch instruction issued by the instruction unit and results of a detection by the detection unit. And the control unit controls the plurality of drive units so as to set all of the plurality of electrical loads in a non-operating state if an instruction to switch drive among the plurality of electrical loads is issued by the instruction unit, and controls the plurality of drive units so as to switch drive to an electrical load selected through the drive switch instruction after verifying that the plurality of electrical loads are all set in a non-operating state based upon the results of the detection by the detection unit.

An electrical load drive control method according to the present invention comprises: setting all of a plurality of electrical loads into a non-operating state if a drive switch instruction to switch drive among the plurality of electrical loads is issued; verifying whether or not all of the plurality of electrical loads have entered a non-operating state; and switching to drive an electrical load selected through the drive switch instruction after verifying that all of the plurality of electrical loads have been set in a non-operating state.

BRIEF DESCRIPTION OF THE DRAWINGS

FIG. 5 presents Table 1 of the transition conditions for the ON/OFF states of the low beams and the high beams.

DESCRIPTION OF THE PREFERRED EMBODIMENTS

Figure 1:
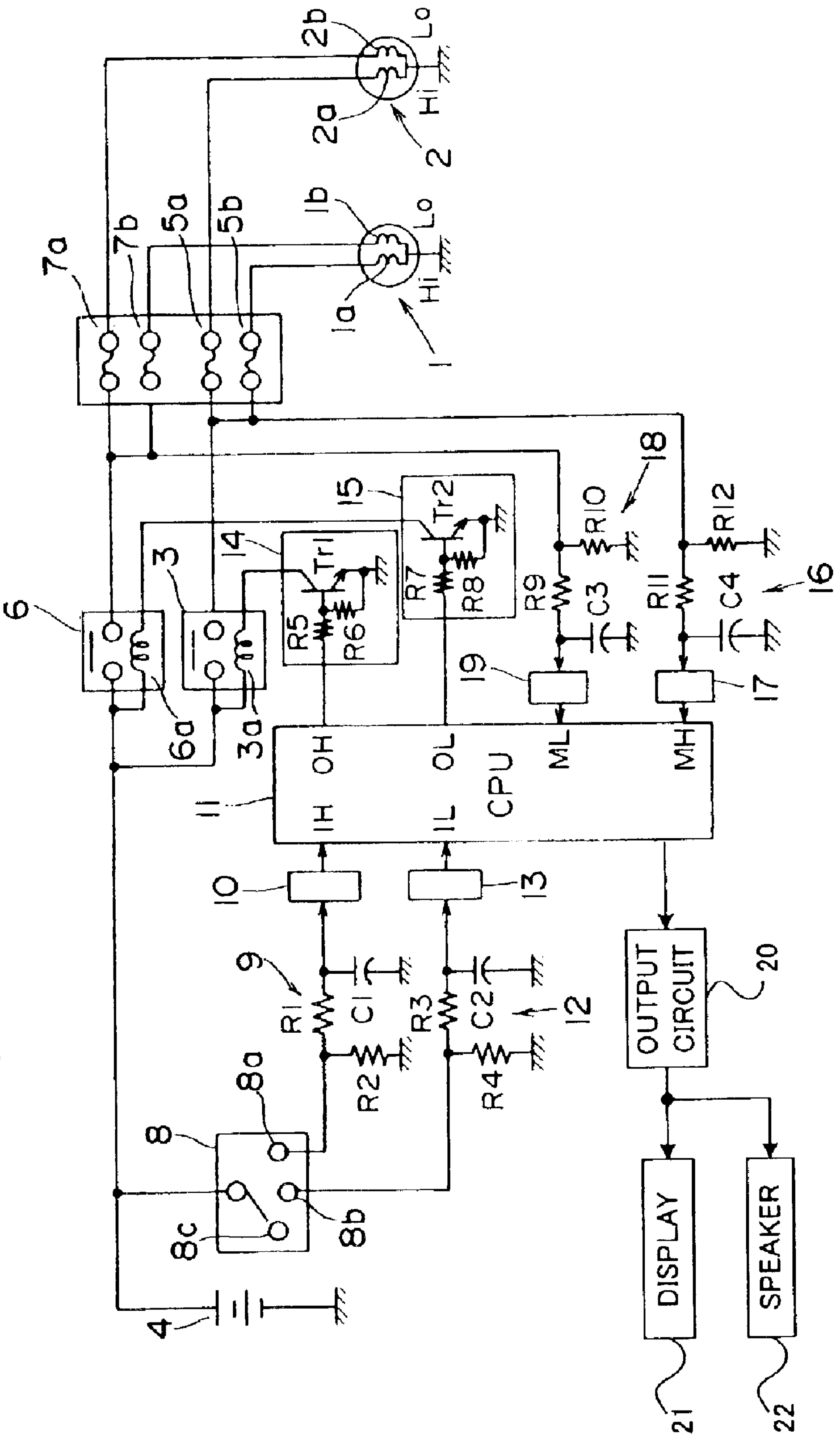
FIG. 1 shows the structure adopted in an embodiment.

An embodiment of the control apparatus which turns ON/OFF headlamps constituting electrical loads in a vehicle is explained. FIG. 1 shows the structure adopted in the embodiment. A head lamp 1 and a head lamp 2 respectively on the left side and the right side viewed from the front of the vehicle each include a high beam filament 1*a* or 2*a* and a low beam filament 1*b* or 2*b* provided within a single bulb.

A high beam relay 3 applies power from a battery 4 to the high beam filaments 1*a* and 2*a* via fuses 5*a* and 5*b* to turn on the left and right headlamps 1 and 2 to high beams. In addition a low beam relay 6 applies power from the battery 4 to the low beam filaments 1*b* and 2*b* via fuses 7*a* and 7*b* to turn on the left and right headlamps 1 and 2 to low beams.

A light switch 8 is operated to select a high beams ON state (8*a*), a low beams ON state (8*b*) or a headlamps OFF state (8*c*). When the light switch 8 is set to the high beams ON position 8*a*, the power from the battery 4 is applied to a high beam setting detection circuit 10 via a CR input circuit 9 (R1, R2 and C1), and the high beam setting detection circuit 10, in turn, outputs a high level signal "1" to an input terminal 1H of a microcomputer 11. When the light switch 8 is set to the low beams ON position 8*b*, the power from the battery 4 is applied to a low beam setting detection circuit 13 via a CR input circuit 12 (R3, R4 and C2), and the low beam setting detection circuit 13 outputs a high-level signal "1" to an input terminal IL of the microcomputer 11.

The microcomputer 11, which includes peripheral components such as ROM and RAM, executes a control program to be detailed later to implement ON/OFF control for low beams and high beams at the left and right headlamps 1 and 2.

A high beam relay drive circuit 14 (R5, R6 and Tr1) drives a coil 3*a* of the high beam relay 3. As a high level signal is output through an output terminal OH of the microcomputer 11, the transistor Tr1 of the high beam relay drive circuit 14 becomes electrically turned on to allow the power from the battery 4 to be supplied to the relay coil 3*a* thereby turning on the high beam relay 3. A low beam relay drive circuit 15 (R7, R8 and Tr2) drives a coil 6*a* of the low beam relay 6. As a high-level signal is output through an output terminal OL of the microcomputer 11, the transistor Tr2 of the low beam relay drive circuit 15 becomes electrically turned on to allow the power from the battery 4 to be supplied to the relay coil 6*a*, thereby turning on the low beam relay 6.

When the high beam relay 3 is in an ON state and thus high beams at the left and right headlamps 1 and 2 are on, the voltage at the battery 4 is applied to a high beam monitor circuit 17 via the relay 3 and a CR input circuit (R11, R12 and C4), and the high beam monitor circuit 17 outputs a high-level signal "1" to a monitor terminal MH of the microcomputer 11. When the low beam relay 6 is in an ON state and thus the low beams at the left and right headlamps 1 and 2 are on, on the other hand, the voltage of the battery 4 is applied to a low beam monitor circuit 19 via the relay 6 and a CR input circuits 18 (R9, R10 and C3), and, as a result, the monitor circuit 19 outputs a high-level signal "1" to monitor terminal ML of the microcomputer 11.

An output circuit 20 drives a display 21 and a speaker 22 to provide a warning in the form of a text message and a voice message when a fusion failure has occurred at the contact point of the high beam relay 3 or the low beam relay 6 or when an ON failure has occurred at the transistor Tr1 of the high beam relay drive circuit 14 or the transistor Tr2 of the low beam relay drive circuit 15.

Figure 2:
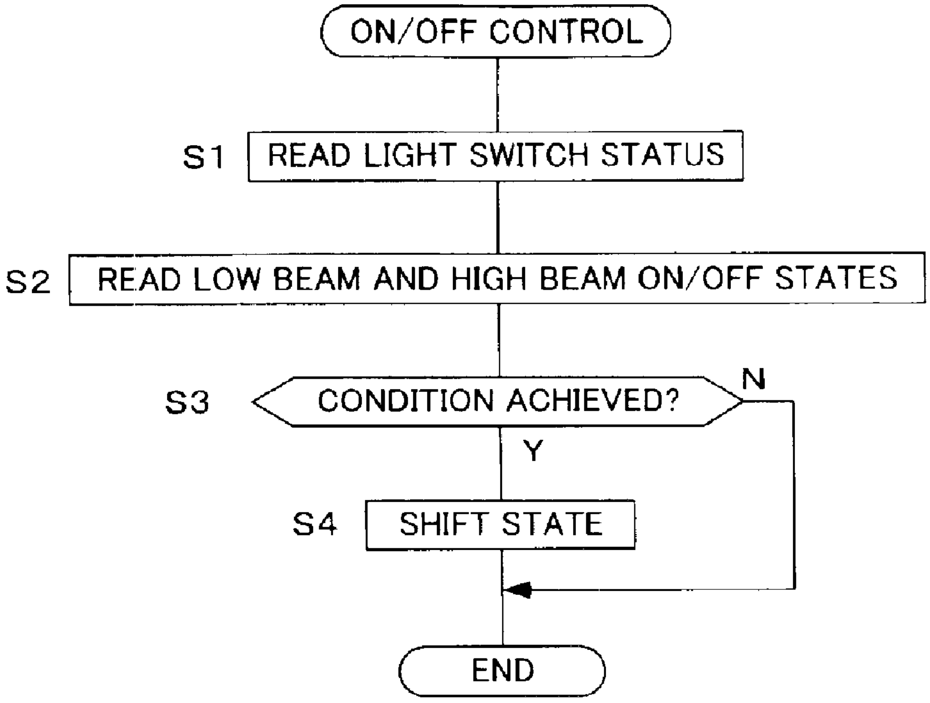
FIG. 2 presents a flowchart of the head lamp ON/OFF control program.
Figure 3:
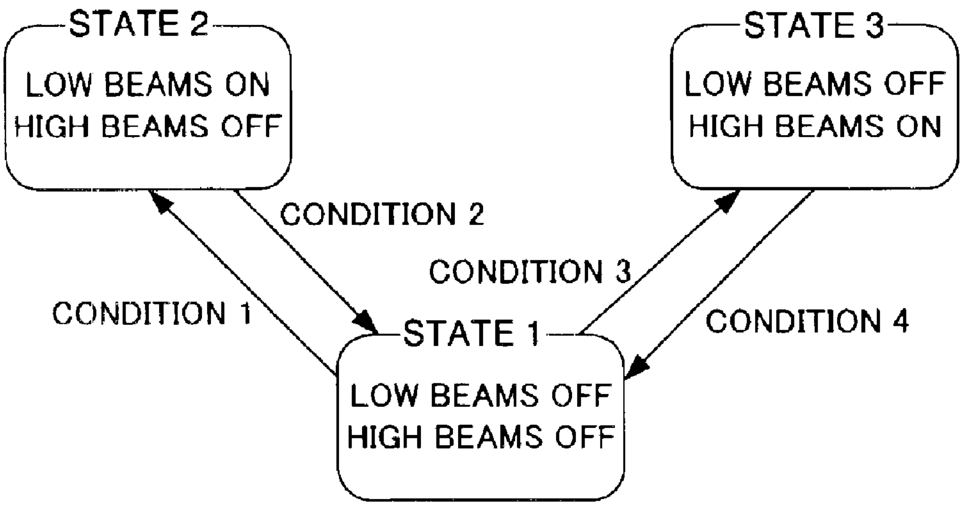
FIG. 3 presents a transition diagram of ON/OFF states of the low beams and the high beams.

FIG. 2 presents a flowchart of the headlamp ON/OFF control program, and FIG. 3 is a transition diagram of the ON/OFF states of the low beams and the high beams. In addition, FIG. 5 presents Table 1 of the transition conditions for the ON/OFF states of the low beam and the high beams. In reference to these figures, the headlamp ON/OFF operation achieved in the embodiment is explained.

The microcomputer 11 executes the headlamp ON/OFF control program shown in FIG. 2 over predetermined time intervals (e.g., approximately every 10 msec). In step S1, the signal levels at the input terminals IH and IL are read to check the setting status of the light switch 8. In the following step S2, the signal levels at the monitor terminals MH and ML are read to check the ON/OFF states of the low beams and the high beams. In step S3, a verification is made to determine whether or not any of conditions 1~4 in Table 1 of FIG. 5 is achieved, based upon the setting status of the light switch 8 and the ON/OFF states of the low beams and the high beams. If one of the conditions 1~4 is achieved, the operation proceeds to step S4 to induce a transition in conformance to the transition condition shown in FIG. 3 to implement ON/OFF control on the low beams and the high beams.

To explain the operation in more specific terms, while the light switch 8 is set to the OFF position 8*c*, the output levels of the high beam setting detection circuit 10 and the low beam setting detection circuit 13, i.e., the levels at the input terminals IH and IL of the microcomputer 11, are both "0" and the low beams and the high beams are both off, as in "the state 1" in FIG. 3.

As the light switch 8 is switched from the OFF position 8*c* to the low beams ON position 8*b* subsequently, the output level of the low beam setting detection circuit 13, i.e., the level at the input terminal IL of the microcomputer 11, shifts to "1". At this time, the level at the input terminal IH of the microcomputer 11 remains at "0". In step S1, the microcomputer 11 reads the setting status of the light switch 8 to indicate that a low beam ON request has been issued. Next, the on, off states of the low beams and the high beams are verified in step S2. At this point, both the low beams and the high beams are in an OFF state.

When a low beam ON request has been issued and, at the same time, the high beams are determined to be in an OFF state, it is decided in step S3 that the condition 1 in Table 1 is satisfied and then the operation proceeds to step S4. In step S4, a transition from the state 1 to the state 2 is made in conformance to the condition 1 to turn on the low beams while the high beams remain off.

In addition, if the light switch 8 is switched from the low beams ON position 8*b* to the high beams ON position 8*a* in the transition state 2, i.e., while the low beams are on, the output level of the low beam setting detection circuit 13, i.e., the level at the input terminal IL shifts to "0" and the output of the high beam setting detection circuit 10, i.e., the level at the input terminal IH, shifts to "1". In step S1, the microcomputer 11 determines the setting status of the light switch 8 to indicate that a low beam OFF request and a high beam ON request have been issued. Next, in step S2, the ON/OFF states of the low beams and the high beams are checked. At this point, the low beams are on.

When there is a high beam ON request while the low beams are on, i.e., in the transition state 2, it is decided in step S3 that the condition 2 in Table 1 is achieved and the operation then proceeds to step S4. In step S4, a transition from the state 2 to the state 1 is made in conformance to the condition 2 to turn off both the low beams and the high beams.

Since the high beam ON request is continuously issued in this state as long as the setting of the light switch 8 remains unchanged, the ON/OFF control program in FIG. 2 is executed again after the predetermined time interval to check whether or not a high beam ON request is currently issued in step S1. Then, in the following step S2, the ON/OFF states of the low beams and the high beams are checked. At this point, both the low beams and the high beams are off.

When there is a high beam ON request and, at the same time, it is verified that the low beams are off in the transition state 1, it is decided in step S3 that the transition condition 3 in Table 1 is achieved and then the operation proceeds to step S4. In step S4, a transition from the state 1 to the state 3 is made in conformance to the condition 3 to turn on the high beams while the low beams remain off.

If, on the other hand, the light switch 8 is switched from the high beams ON position 8*a* to the low beams ON position 8*b* in the state 3, i.e., while the high beams are on, the output of the high beam setting detection circuit 10, and ultimately the level at the input terminal IH shifts to "0" and the output of the low beam setting detection circuit 13, and ultimately the level at the input terminal IL, shifts to "1". In step S1, the microcomputer 11 determines the setting status of the light switch 8 to indicate that a high beam OFF request and a low beam ON request have been issued. Next, in step S2, the ON/OFF states of the low beams and the high beams are checked. At this point, the high beams are off.

When there is a low beam ON request in the transition state 3, i.e., while the high beams are on, it is decided in step S3 that the condition 4 in Table 1 is achieved before the operation proceeds to step S4. In step S4, a transition from the state 3 to the state 1 is made in conformance to the condition 4 to turn off both the low beams and the high beams.

Since the low beam ON request is continuously issued in this state as long as the setting status of the light switch 8 remains unchanged, the ON/OFF control program in FIG. 2 is executed again after the predetermined time interval to check whether or not a low beam ON request is currently issued in step S1. Then, in the following step S2, the ON/OFF states of the low beams and the high beams are checked. At this point, both the low beams and the high beams are off.

When there is a low beam ON request and, at the same time, it is verified that the high beams are off in the transition state 1 , it is decided in step S3 that the transition condition 1 in Table 1 is achieved and then the operation proceeds to step S4. In step S4, a transition from the state 1 to the state 2 is made in conformance to the condition 1 to turn on the low beams while the high beams remain off.

Lastly, if the light switch 8 is switched from the low beams ON position 8*b* to the OFF position 8*c* in the transition state 2, i.e., while the low beams are on, the output of the low beam setting detection circuit 13, and ultimately the level at the input terminal IL, shifts to "0" while the output of the high beam setting detection circuit 10, and ultimately the level at the input terminal IH, remains unchanged at "0". In step S1 the microcomputer 11 determines the setting status of the light switch 8 to indicate that a low beam OFF request has been issued.

When there is a low beam OFF request in the transition state 1, it is decided in step S3 that the transition condition 2 in Table 1 is achieved before the operation proceeds to step S4. In step S4, a transition from the state 2 to the state 1 is made in conformance to the condition 2 to turn off low beams.

Let us now consider a situation in which a fusion failure has occurred at the contact point of the low beam relay 6 or an ON failure has occurred at the transistor Tr2 of the low beam relay drive circuit 15 while the low beams are on. If the light switch 8 is switched from the low beams ON position 8*b* to the high beams ON position 8*a* in this state, the microcomputer 11 determines that a high beam ON request has been issued based upon the changes in the signal levels at the input terminals IH and IL. Accordingly, since the transition condition 2 in Table 1 is achieved, a transition from the state 2 to the state 1 is made to turn off both the low beams and the high beams.

In this state, the high beam ON request is continuously issued as long as the setting at the light switch 8 remains unchanged. However, since the low beams are still on due to the contact fusion at the low beam relay 6 or the ON failure of the transistor Tr2 of the low beam relay drive circuit 15, the level at the monitor terminal ML remains high. As a result, it cannot be verified that the low beams have been turned off and thus, the transition condition 3 in Table 1 is not achieved. Accordingly, the state 1 is sustained without making a transition to the state 3.

Consequently, it is possible to prevent the high beams from being turned on when the low beams cannot be turned off due to a fusion failure at the contact point of the low beam relay 6 or due to an ON failure at the transistor Tr2 of the low beam relay drive circuit 15, thus, the low beams and the high beams are not allowed to be on at the same time to overheat both lamps, which would shorten the service life of the lamps.

It is to be noted that if the level of the monitor terminal ML is "1" in the transition state 1, it is decided that either a fusion failure at the contact point of the low beam relay 6 or an ON failure at the transistor Tr2 of the low beam relay drive circuit 15 has occurred and, accordingly, a warning is displayed at the display 21 and is also issued through the speaker 22 via the output circuit 20.

Let us also consider a situation in which a fusion failure has occurred at the contact point of the high beam relay 3 or an ON failure has occurred at the transistor Tr1 of the high beam relay drive circuit 14 while the high beams are on. If the light switch 8 is switched from the high beams ON position 8*a* to the low beams ON position 8*b* in this state, the microcomputer 11 determines that a low beam ON request has been issued based upon the changes in the signal levels at the input terminals IH and IL. Accordingly, since the transition condition 4 in Table 1 is achieved, a transition from the state 3 to the state 1 is made to turn off both the low beams and the high beams.

In this state, the low beam ON request is continuously issued as long as the setting status of the light switch 8 remains unchanged. However, since the high beams are still on due to the contact fusion at the high beam relay 3 or due to the ON failure of the transistor Tr1 of the high beam relay drive circuit 14, the level at the monitor terminal MH remains high. As a result, it cannot be verified that the high beams have been turned off and thus, the transition condition 1 in Table 1 is not achieved. Accordingly the state 1 is sustained without making a transition to the state 2.

Consequently, it is possible to prevent the low beams from being turned on when the high beams cannot be turned off due to a fusion failure at the contact point of the high beam relay 3 or due to an ON failure at the transistor Tr1 of the high beam relay drive circuit 14, and thus low beams and high beams are not allowed to be turned on at the same time to overheat both lamps, which would shorten the service life of the lamps.

It is to be noted that if the level at the monitor terminal MH is "1" in the transition state 1, it is decided that either a fusion failure at the contact point of the high beam relay 3 or an ON failure at the transistor Tr1 of the high beam relay drive circuit 14 has occurred and, accordingly, a warning is displayed at the display 21 and is also issued through the speaker 22 via the output circuit 20.

As explained above, the transition from the state 2 to the state 3 or from the state 3 to the state 2 is invariably made by first shifting into the state 1 to verify that the low beams and the high beams are both off and, as a result, the low beams and the high beams are not allowed to be turned on at the same time even if a fusion failure has occurred at the contact point at the low beam relay 6 or the high beam relay 3 or an ON failure has occurred at the transistor Tr2 of the low beam relay drive circuit 15 or the transistor Tr1 of the high beam relay drive circuit 14.

It is to be noted that since a state transition is achieved over an extremely short length of time of approximately 10 msec in the actual ON/OFF control, the driver would not notice that both lamps are momentarily turned off when switching between the low beams and the high beams and thus, the driver experiences smooth operation of the headlamps.

(Example of Variation of the Embodiment of the Invention)

Figure 4:
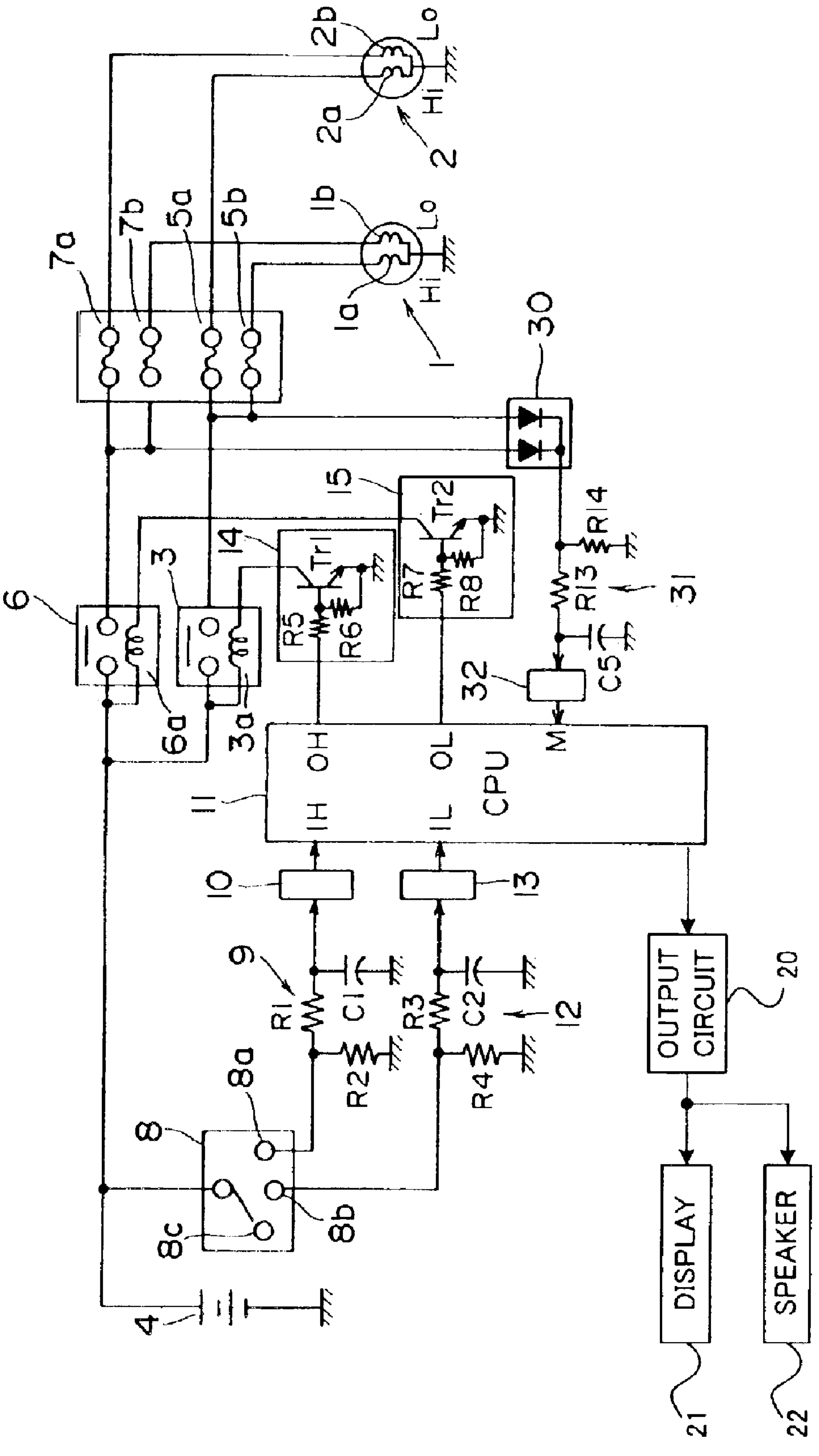
FIG. 4 shows the structure achieved in a variation of the embodiment.

FIG. 4 shows an example of a variation of the embodiment. It is to be noted that the same reference numerals are assigned to components identical to those in FIG. 1 and the following explanation focuses on the difference. In this variation, an OR circuit 30, a CR input circuit (R13, R14 and C5) 31 and a monitor circuit 32 are employed in place of the CR input circuit 16 and the monitor circuit 17 for the low beams and the CR input circuit 18 and the monitor circuit 19 for high beams shown in FIG. 1.

When both the low beams and the high beams or either the low beams or the high beams are on, the output voltage of the OR circuit 30 is equal to the terminal voltage at the battery 4. In this situation, the monitor circuit 32 outputs a signal indicating that a high level "1" to a monitor terminal M of the microcomputer 11. If, on the other hand, both the low beams and the high beams are off, the output voltage of the OR circuit 30 is 0V. In this case, the monitor circuit 32 outputs a low level "0" to the monitor terminal M.

If the level at the monitor terminal M is low, i.e., "0", in the transition state 1, it can be judged that both the low beams and the high beams are off. Thus, a simpler circuit structure is achieved in the variation compared to that of the monitor circuits in the embodiment described earlier and, as a result, the number of input terminals at the microcomputer 11 can be reduced.

It is to be noted that while an explanation is given above in reference to the embodiment on an example in which the headlamps constitute the electrical loads in the vehicle, the present invention may be adopted in conjunction with vehicle electrical loads other than headlamps. For instance, the electrical loads may be the left and right turn signal lamps instead. Namely, the present invention may be adopted in conjunction with any electrical loads that are alternately engaged in operation. In addition, while an explanation is given above in reference to the embodiment on an example in which low beams and high beams at the headlamps constitute vehicle electrical loads, the number of electrical loads is not limited to the example of the embodiment. Furthermore, the present invention may be adopted in conjunction with electrical loads in non-automotive applications. The terms "electrical loads" as referred to in this context may be regarded to mean electrical or electronic components, electrical or electronic elements or electrical or electronic devices.

While an explanation is given above in reference to the embodiment on an example in which the vehicle electrical loads are driven with a voltage applied to them, the present invention is not limited to this example. The electrical loads may instead be driven by implementing control so as to lower the potential at either terminal to the ground level while applying the voltage to another terminal. In short, the present invention may be adopted in any method for driving electrical loads in a vehicle.

The following advantages are achieved in the control apparatus in the embodiment explained above.

(1) Even if a failure occurs in a drive circuit or the like, simultaneous operation of a plurality of electrical loads, which should be alternately engaged in operation, can be prevented.

(2) A non-operating state of electrical loads can be reliably detected at low cost.

(3) The factors of the detection circuit that detects a non-operating state of an electrical load and the control circuit that controls operations of the electrical loads based upon the results of the detection can be simplified.

(4) The driver can be alerted if a failure occurs in the means for drive.

The above described embodiments are examples and various modifications can be made without departing from the spirit and scope of the invention.

The disclosure of the following priority application is herein incorporated by reference:

Japanese Patent Application No. 2002-066582 filed Mar. 12, 2002.

What is claimed is:

1. An electrical load drive control apparatus comprising:

a plurality of drive units, each of which drives one of a plurality of electrical loads;

an instruction unit that issues a drive switch instruction to switch drive among the plurality of electrical loads;

a detection unit that detects a non-operating state of the plurality of electrical loads; and a control unit that controls the plurality of drive units based upon the drive switch instruction issued by the instruction unit and results of a detection by the detection unit, wherein:

the control unit controls the plurality of drive units so as to set all of the plurality of electrical loads in a non-operating state if an instruction to switch drive among the plurality of electrical loads is issued by the instruction unit, and controls the plurality of drive units so as to switch drive to an electrical load selected through the drive switch instruction after verifying that the plurality of electrical loads are all set in a non-operating state based upon the results of the detection by the detection unit.

2. An electrical load drive control apparatus according to claim 1, wherein:

the plurality of electrical loads are electrical loads in a vehicle.

3. An electrical load drive control apparatus according to claim 2, wherein:

the plurality of electrical loads in the vehicle are a load corresponding to a high beam at a headlamp and a load corresponding to a low beam at the headlamp.

4. An electrical load drive control apparatus according to claim 1, wherein:

the drive units each drive one of the plurality of electrical loads by applying a voltage thereto; and the detection unit detects the voltage applied to each of the plurality of electrical loads and detects an electrical load to which the voltage is not applied as an electrical load in a non-operating state.

5. An electrical load drive control apparatus according to claim 1, wherein:

the drive units each drive one of the plurality of electrical loads by applying a voltage thereto; and the detection unit detects an OR of voltages applied to the plurality of electrical loads and detects that all the plurality of electrical loads are in a non-operating state when the OR is 0.

6. A vehicle electrical load control apparatus according to claim 1, further comprising:

a warning unit that issues a warning if all of the plurality of electrical loads cannot be verified to have entered a non-operating state based upon the results of the detection by the detection unit after the control unit controls the plurality of drive units to set all of the plurality of electrical loads into a non-operating state.

7. An electrical load drive control apparatus according to claim 3, wherein:

the control unit allows transitions among a state 1 in which neither the load corresponding to the high beam nor the load corresponding to the low beam is driven, a state 2 in which the load corresponding to the high beam is not driven but the load corresponding to the low beam is driven and a state 3 in which the load corresponding to the high beam is driven but the load corresponding to the low beam is not driven; and the control unit controls the plurality of drive units so that a transition to the state 2 is made if an instruction to drive the load corresponding to the low beam is issued and also the load corresponding to the high beam is verified not to be driven in the state 1, a transition to the state 1 is made if an instruction to stop drive of the load corresponding to the low beam or an instruction to drive the load corresponding to the high beam is issued in the state 2, a transition to the state 3 is made if an instruction to drive the load corresponding to the high beam is issued and also the load corresponding to the low beam is verified not to be driven in the state 1, and a transition to the state 1 is made if an instruction to stop drive of the load corresponding to the high beam or an instruction to drive the load corresponding to the low beam is issued in the state 3.

8. An electrical load drive control method, comprising:

setting all of a plurality of electrical loads into a non-operating state if a drive switch instruction to switch drive among the plurality of electrical loads is issued;

verifying whether or not all of the plurality of electrical loads have entered a non-operating state; and switching to drive an electrical load selected through the drive switch instruction after verifying that all of the plurality of electrical loads have been set in a non-operating state.

9. An electrical load drive control method according to claim 8, wherein:

the plurality of electrical loads are electrical loads in a vehicle.

10. An electrical load drive control method according to claim 9, wherein:

the plurality of electrical loads in a vehicle are a load corresponding to a high beam at a headlamp and a load corresponding a low beam at the headlamp.

11. An electrical load drive control method according to claim 8, wherein:

the plurality of electrical loads are each driven with a voltage applied thereto; and a verification as to whether or not all of the plurality of electrical loads have entered a non-operating state is made by detecting the voltage applied to each of the plurality of electrical loads.

12. An electrical load drive control method according to claim 8, wherein:

the plurality of electrical loads are each driven with a voltage applied thereto;

a verification as to whether or not all of the plurality of electrical loads have entered a non-operating state is made by detecting an OR of voltages applied to the plurality of electrical loads; and all of the plurality of electrical loads are verified to be in a non-operating state when the OR is 0.

13. An electrical load drive control method according to claim 8, wherein:

if a verification that all of the plurality of electrical loads have entered a non-operating state cannot be made after setting the plurality of electrical loads into a non-operating state, a warning is issued.

14. An electrical load drive control method, comprising:

controlling drive of a load corresponding to a high beam of a vehicle headlamp and a load corresponding to a low beam of the vehicle headlamp to make a transition among a state 1 in which neither the load corresponding to the high beam nor the load corresponding to the low beam is driven, a state 2 in which the load corresponding to the high beam is not driven but the load corresponding to the low beam is driven and a state 3 in which the load corresponding to the high beam is driven but the load corresponding to the low beam is not driven;

controlling drive of the load of corresponding to the high beam and the load corresponding to the low beam so as to make a transition to the state 2 if an instruction to drive the load corresponding to the low beam is issued and also the load corresponding to the high beam is verified not to be driven in the state 1;

controlling drive of the load corresponding to the high beam and the load corresponding to the low beam so as to make a transition to the state 1 if an instruction to stop drive of the load corresponding to the low beam or an instruction to drive the load corresponding to the high beam is issued in the state 2;

controlling drive of the load corresponding to the high beam and the load corresponding to the low beam so as to make a transition to the state 3 if an instruction to drive the load corresponding to the high beam is issued and also the load corresponding to the low beam is verified not to be driven in the state 1; and controlling the drive of the load corresponding to the high beam and the load corresponding to the low beam so as to make a transition to the state 1 if an instruction to stop drive of the load corresponding to the high beam or an instruction to drive the load corresponding to the low beam is issued in the state 3.

15. An electrical load drive control apparatus comprising:

a plurality of drive means for respectively driving a plurality of electrical loads;

a instruction means for issuing a drive switch instruction to switch drive among the plurality of electrical loads;

a detection means for detecting a non-operating state of the plurality of electrical loads; and a control means for controlling the plurality of drive units based upon the drive switch instruction issued by the instruction means and results of a detection by the detection means, wherein:

the control means controls the plurality of drive means so as to set all of the plurality of electrical loads in a non-operating state if an instruction to switch drive among the plurality of electrical loads is issued by the instruction means, and controls the plurality of drive means so as to switch drive to an electrical load selected through the drive switch instruction after verifying that the plurality of electrical loads are all set in a non-operating state based upon the results of the detection by the detection means.

* * * * *